US012273299B2

(12) United States Patent
Chen et al.

(10) Patent No.: US 12,273,299 B2
(45) Date of Patent: *Apr. 8, 2025

(54) INTER-POINT PARAMETER SIGNALING IN COORDINATED MULTI-POINT (CoMP) NETWORKS

(71) Applicant: Texas Instruments Incorporated, Dallas, TX (US)

(72) Inventors: Runhua Chen, Plano, TX (US); Ralf M. Bendlin, Plano, TX (US); Anthony E. Ekpenyong, Houston, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/556,868

(22) Filed: Aug. 30, 2019

(65) Prior Publication Data

US 2019/0394008 A1    Dec. 26, 2019

Related U.S. Application Data

(63) Continuation of application No. 14/322,575, filed on Jul. 2, 2014, now Pat. No. 10,404,442.

(Continued)

(51) Int. Cl.
*H04L 5/00* (2006.01)
*H04B 7/024* (2017.01)
(Continued)

(52) U.S. Cl.
CPC .......... *H04L 5/0073* (2013.01); *H04B 7/024* (2013.01); *H04B 7/063* (2013.01); *H04B 7/0634* (2013.01);
(Continued)

(58) Field of Classification Search
CPC ..... H04L 5/0073; H04L 5/0035; H04B 7/063; H04B 7/024; H04B 7/0634; H04W 52/40;
(Continued)

(56) References Cited

U.S. PATENT DOCUMENTS 10,404,442 B2 * 9/2019 Chen ................... H04L 5/0035
2011/0103330 A1 * 5/2011 Montojo ............... H04W 72/04
370/329

(Continued)

OTHER PUBLICATIONS

Prosecution History; U.S. Appl. No. 14/322,575, filed Jul. 2, 2014, 1101 pages.

*Primary Examiner* — Abdullahi E Salad
(74) *Attorney, Agent, or Firm* — Gregory J. Albin; Frank D. Cimino

(57) ABSTRACT

A transmission point (TP) comprises a processor configured to generate a transmission parameter related to a transmission property of the TP, wherein the transmission parameter comprises at least one of a transmission rank, a beamforming matrix, a transmission power, and an on/off status, and a transmitter coupled to the processor and configured to transmit the transmission parameter as part of a coordinated multi-point (CoMP) scheme. A transmission point (TP) comprises a processor configured to generate a transmission parameter related to a desired transmission property, wherein the transmission parameter comprises at least one of a transmission rank, a beamforming matrix, a transmission power, and an on/off status, and a transmitter coupled to the processor and configured to transmit the transmission parameter as part of a coordinated multi-point (CoMP) scheme.

17 Claims, 3 Drawing Sheets

Related U.S. Application Data

(60) Provisional application No. 61/865,474, filed on Aug. 13, 2013, provisional application No. 61/842,152, filed on Jul. 2, 2013.

(51) Int. Cl.
  *H04B 7/06* (2006.01)
  *H04W 52/24* (2009.01)
  *H04W 52/40* (2009.01)

(52) U.S. Cl.
  CPC ......... *H04L 5/0035* (2013.01); *H04W 52/243* (2013.01); *H04W 52/247* (2013.01); *H04W 52/248* (2013.01); *H04W 52/40* (2013.01)

(58) Field of Classification Search
  CPC ............. H04W 52/248; H04W 52/247; H04W 52/243
  See application file for complete search history.

(56) References Cited

U.S. PATENT DOCUMENTS

| | | |
|---|---|---|
| 2011/0268007 A1 | 11/2011 | Barany et al. |
| 2013/0077514 A1* | 3/2013 | Dinan .................. H04J 11/0053 370/252 |
| 2013/0083681 A1* | 4/2013 | Ebrahimi Tazeh Mahalleh .......... H04B 7/0626 370/252 |
| 2013/0089159 A1* | 4/2013 | Liu ........................ H04B 7/026 375/267 |
| 2013/0229971 A1* | 9/2013 | Siomina ................ H04W 24/10 370/312 |
| 2013/0295949 A1* | 11/2013 | Seo ........................ H04W 72/27 455/452.1 |
| 2014/0162717 A1* | 6/2014 | Liu ........................ H04L 5/0051 455/522 |
| 2014/0226612 A1 | 8/2014 | Kim et al. |
| 2014/0301299 A1* | 10/2014 | Wu ........................ H04L 5/0053 370/329 |
| 2015/0036519 A1 | 2/2015 | Kazmi et al. |
| 2015/0049693 A1* | 2/2015 | Seo ........................ H04L 5/0096 370/329 |
| 2015/0124736 A1* | 5/2015 | Ko ........................ H04B 7/0626 370/329 |
| 2015/0181536 A1* | 6/2015 | Pedersen ........... H04W 72/0473 370/311 |
| 2015/0256306 A1 | 9/2015 | Kim et al. |

* cited by examiner

INTER-POINT PARAMETER SIGNALING IN COORDINATED MULTI-POINT (CoMP) NETWORKS

CROSS-REFERENCE TO RELATED APPLICATION

This application is a continuation application and claims priority to U.S. patent application Ser. No. 14/322,575, filed Jul. 2, 2014, which claims benefit of U.S. provisional patent application No. 61/842,152, filed Jul. 2, 2013 by Runhua Chen, et al., and titled "Inter-Point Signaling for Enhanced Interference Mitigation/Suppression in Coordinated Multi-Point (CoMP) System" and U.S. provisional patent application No. 61/865,474 filed Aug. 13, 2013 by Runhua Chen, et al., and titled "Inter-Point Signaling for Enhanced Interference Mitigation/Suppression in Coordinated Multi-Point (CoMP) System," all of which are incorporated herein by reference.

BACKGROUND

Cellular communication networks may incorporate wireless terminal devices and base stations for the purpose of providing communications services such as telephony, data, video, messaging, chat, and broadcast. Multiple wireless terminals may be connected to a serving cell that is controlled by a base station (BS). Typical access schemes employed in cellular networks include frequency division multiple access (FDMA), time division multiple access (TDMA), code division multiple access (CDMA), orthogonal frequency division multiple access (OFDMA), and single-carrier frequency division multiple access (SC-FDMA). A BS may also be referred to as a NodeB in Universal Mobile Telecommunications System (UMTS), an evolved NodeB (eNB) in Long-Term Evolution (LTE) specified by the 3rd Generation Partnership Project (3GPP), a base transceiver system (BTS), or an access point (AP).

In general, an eNB may be fixed hardware (i.e., not mobile), but in some cases, such as when deployed in a car, may also be mobile. The wireless terminal devices may be portable hardware. The wireless terminal device may be referred to as a user equipment (UE), a mobile station, a cellular phone, a personal digital assistant (PDA), or a wireless modem card. Uplink (UL) communication may refer to communication from a UE to a eNB, while downlink (DL) communication may refer to communication from the eNB to the UE. An eNB may comprise radio frequency (RF) transmitters and receivers used to directly communicate with UEs, which may either be in a fixed location or freely move around the eNB. Similarly, each UE may comprise RF transmitters and receivers used to communicate directly with the eNB.

Conventional cellular communication networks operate in a point-to-point, single-cell transmission fashion where a UE is uniquely connected to and served by a single eNB at a given time. An example of such a network is described in 3GPP Long-Term Evolution (LTE) Release 8 (Rel-8), which is incorporated by reference. Advanced cellular systems are intended to further improve the data rate and performance by adopting multi-point-to-point or coordinated multi-point (CoMP) communication where multiple base stations can cooperatively design downlink transmissions to simultaneously serve a UE. An example of such a system is the 3GPP LTE-Advanced (LTE-A) system. Those approaches greatly improve received UE signal strength by transmitting the same signal to the UE from different eNBs. This is particularly beneficial for cell edge UEs that observe strong interference from neighboring base stations.

SUMMARY

In one embodiment, the disclosure includes a transmission point (TP) comprising a processor configured to generate a transmission parameter related to a transmission property of the TP, wherein the transmission parameter comprises at least one of a transmission rank, a beamforming matrix, a transmission power, and an on/off status, and a transmitter coupled to the processor and configured to transmit the transmission parameter as part of a coordinated multi-point (CoMP) scheme.

In another embodiment, the disclosure includes a transmission point (TP) comprising a processor configured to generate a transmission parameter related to a desired transmission property, wherein the transmission parameter comprises at least one of a transmission rank, a beamforming matrix, a transmission power, and an on/off status, and a transmitter coupled to the processor and configured to transmit the transmission parameter as part of a coordinated multi-point (CoMP) scheme.

In yet another embodiment, the disclosure includes an apparatus comprising a receiver configured to receive a transmission parameter as part of a coordinated multi-point (CoMP) scheme, a processor coupled to the receiver and configured to process the transmission parameter, and generate transmission instructions based on the transmission parameter, and a transmitter coupled to the processor and configured to transmit a radio subframe based on the transmission instructions.

In yet another embodiment, the disclosure includes a transmission point (TP) comprising a receiver configured to receive a transmission parameter as part of a coordinated multi-point (CoMP) scheme, wherein the transmission parameter is at least one of a transmission rank, a beamforming matrix, a transmission power, and an on/off status, a processor coupled to the receiver and configured to process the transmission parameter, and generate transmission instructions based on the transmission parameter, wherein the transmission instructions comprise instructions to adjust at least one of a transmission power, a transmission direction, and a transmission scheduling, and a transmitter coupled to the processor and configured to transmit a radio subframe based on the transmission instructions.

In yet another embodiment, the disclosure includes a method comprising receiving a transmission parameter as part of a coordinated multi-point (CoMP) scheme, processing the transmission parameter, generating transmission instructions based on the transmission parameter, and transmitting a radio subframe based on the transmission instructions.

BRIEF DESCRIPTION OF THE DRAWINGS

For a detailed description of various examples, reference will now be made to the accompanying drawings in which.

NOTATION AND NOMENCLATURE

Figure 1:
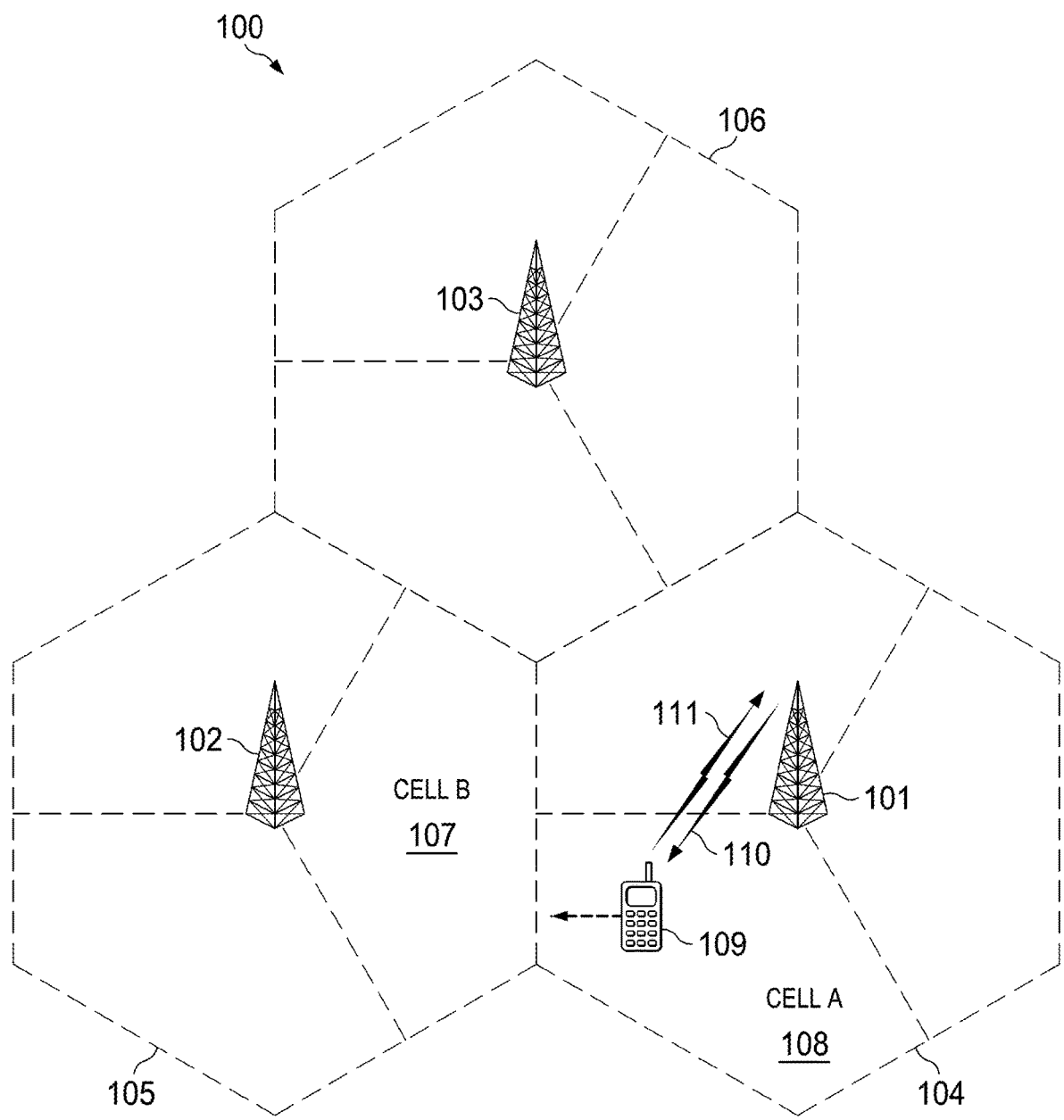
FIG. 1 is a schematic diagram of a traditional cellular network.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical or wireless connection. Thus, if a first device couples to a second device, that connection may be through a direct electrical or wireless connection, or through an indirect electrical or wireless connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The following acronyms are used throughout:
3GPP: 3rd Generation Partnership Project
ABS: almost-blank-subframe
AP: access point
BS: base station
BTS: base transceiver system
CCI: co-channel interference
CDMA: code division multiple access
CoMP: coordinated multi-point
CPRI: common public radio interface
CQI: channel quality indicator
CRS: cell-specific reference signal
CS/CB: coordinated scheduling/beamforming
CSI: channel state information
CSI-RS: channel state information reference signal
dBm: decibel-milliwatts
DL: downlink
DMRS: demodulation reference signal
DPB: dynamic point blanking
DPS: dynamic point selection
eNB: evolved NodeB
EPDCCH: enhanced physical downlink control channel
E-UTRAN: Evolved Universal Terrestrial Radio Access Network
FDMA: frequency division multiple access
ICI: inter-channel interference
ID: identifier
I/O: input/output
IRC: interference rejection combining
JP: joint processing
JT: joint transmission
LTE: Long-Term Evolution
LTE-A: Long-Term Evolution Advanced
MBSFN: multicast-broadcast single-frequency network
MIMO: multiple-input multiple-output
ms: millisecond
OFDM: orthogonal frequency-division multiplexing
OFDMA: orthogonal frequency division multiple access
PDA: personal digital assistant
PDCCH: physical downlink control channel
PDSCH: physical downlink shared channel
PMCH: physical multicast channel
PMI: precoding matrix indicator
PRB: physical resource block
PRG: precoding resource block group
PUCCH: physical uplink control channel
PUSCH: physical uplink shared channel
QAM: quadrature amplitude modulation
QPSK: quadrature phase-shift keying
RAN: Radio Access Network
RB: resource block
RE: resource element
Rel-8: 3GPP LTE Release 8
Rel-9: 3GPP LTE Release 9
Rel-10: 3GPP LTE Release 10
Rel-11: 3GPP LTE Release 11
Rel-12: 3GPP LTE Release 12
RF: radio frequency
RI: rank indicator
RNTP: relative narrow-band transmit power
RSRP: reference signal received power
SC-FDMA: single-carrier frequency division multiple access
SNR: signal-to-noise ratio
SSPS: semi-static point selection
TDMA: time division multiple access
TM: transmission mode
TP: transmission point
TSG: Technical Specification Group
UE: user equipment
UL: uplink
UMTS: Universal Mobile Telecommunications System
X2AP: X2 application protocol.

The cellular spectrum may refer to the sets of frequency ranges within the ultra-high frequency spectrum that have been allocated for cellular phone usage. The cellular spectrum is an expensive resource and thus its efficient use is beneficial. Traditional cellular networks may rely on cell splitting and frequency reuse to achieve that goal. Specifically, a geographical area may be divided into multiple non-overlapping regions, where each region may be referred to as a cell and covered by a designated wireless node, for instance an eNB. In modern cellular networks, one eNB may generate multiple cells by, for instance, employing sectorization. All cells may be configured to operate on the same frequency spectrum, thereby allowing the available spectrum to be reused multiple times in different geographical areas. Each cell may be configured with, and differentiated by, its own cell identifier (ID). Using single-cell transmission and reception, a UE may always be connected to and receive uplink and downlink data from the cell it is connected to.

FIG. 1 is a schematic diagram of a traditional cellular network 100. The network may comprise eNBs 101, 102, and 103 with corresponding coverage areas 104, 105, and 106, respectively. Each coverage area 104-106 may be split into cells. For instance, the coverage area 104 may be split into a cell A 108 and other cells, and the coverage area 105 may be split into a cell B 107 and other cells. A UE 109 may currently be in communication with the eNB 101 on both a downlink channel 110 and an uplink channel 111. Though the network 100 is shown as comprising the eNBs 101-103, the network 100 may also comprise many more eNBs. Each eNB 101-103 may be operable over its corresponding coverage area 104-106. As the UE 109 moves out of the cell A 108 and into the cell B 107, the UE 109 may be handed over to the eNB 102. Because the UE 109 may be synchronized with the eNB 101, the UE 109 may employ non-synchronized random access to initiate a handover to the eNB 102.

In traditional cellular networks such as the network 100, different cells may operate in a semi-independent manner where the uplink and downlink transmissions in the time and frequency domains are determined by each cell without inter-cell coordination. For instance, in the downstream direction (i.e., from an eNB to a UE), each cell may determine the transmission properties associated with the UEs in that cell without considering the transmission properties of other cells. Transmission properties may refer to, for instance, frequency resource allocation, transmission rank, beamforming vectors, modulation, and coding schemes. Signals transmitted by an eNB in one cell may therefore cause inter-cell interference (ICI), or co-channel interference (CCI) with signals transmitted by eNBs in other cells. ICI may be a source of performance bottlenecks, and the problem may be exacerbated as cell sizes continue to decrease, for instance due to the proliferation of small cells. Decreasing ICI is therefore an important issue.

CoMP is one approach to reducing ICI and otherwise improving network performance. CoMP may refer to a scheme where multiple transmission points (TPs), or simply points, in a cooperating set coordinate with each other to cooperatively optimize a downlink transmission in order to reduce or completely suppress ICI. TPs may refer to cells, base stations, eNBs, macro eNBs, pico eNBs, femto eNBs, remote radio heads, distributed antennae, or other wireless transmission entities as appropriate. CoMP may improve various transmission properties, including beamforming vectors, transmission power, transmission scheduling decisions, and ON/OFF status. By scheduling transmissions from multiple TPs, signals transmitted from those TPs may experience reduced ICI or even be transformed into beneficial signals that boost the signal-to-noise ratio (SNR).

Figure 2:
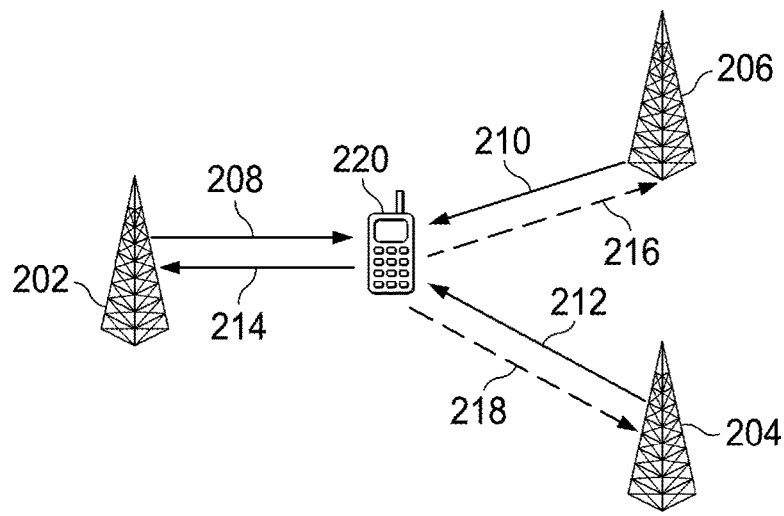
FIG. 2 is a schematic diagram of a cellular network employing CoMP.

FIG. 2 is a schematic diagram of a cellular network 200 employing CoMP. The network 200 may comprise eNBs 202, 204, and 206, as well as a UE 220. The UE 220 may currently be in communication with the eNB 202 on both a downlink channel 208 and an uplink channel 214. In addition, the UE 220 may or may not communicate with the eNB 204 on both a downlink channel 212 and an uplink channel 218, as well the eNB 206 on both a downlink channel 210 and an uplink channel 216. The eNB 202 may primarily provide downlink transmission to the UE 220 via the downlink channel 208; however, if the network 200 employs CoMP, then both the eNB 204 and the eNB 206 may also simultaneously provide downlink transmission to the UE 220. There are many different CoMP schemes, some of which are described more fully below.

A benefit of CoMP is the reduction of the randomness of ICI. When a scheduler is aware of the downlink channel and determines the properties of adjacent cells, ICI may become predictable and controllable. Link adaptation could therefore improve network performance. In 3GPP LTE Release 11 (Rel-11), which is incorporated by reference, channel-aware link adaptation may be achieved by using channel state information (CSI) feedback, where a UE measures CSI, creates reports based on that CSI, and feeds back those reports to serving and non-serving TPs. The TPs may then determine ICI based on the reports.

CoMP may include employ centralized or distributed scheduling. With centralized scheduling, the CSI of different TPs may be forwarded to a central scheduler via the backhaul. The central scheduler may then optimize CoMP transmission properties accordingly. With distributed scheduling, each TP may locally update its scheduling decision and forward that decision to other TPs via the backhaul. Each TP can then optimize its CoMP transmission properties accordingly.

There are many types of CoMP, including joint processing (JP) and coordinated scheduling/beamforming (CS/CB). In JP, data for a UE may be available at more than one TP in a cooperating set for a time-frequency resource. JP may include joint transmission (JT) and dynamic point selection (DPS). JT may comprise simultaneous data transmissions from multiple TPs to a single UE or multiple UEs in a time-frequency resource. JT may coherently or non-coherently improve the received signal quality, improve the data throughput, and cancel actively interference for other UEs. DPS may comprise data transmission from one TP at each time instance. The TP may change from one subframe to another. Data may be available simultaneously at multiple TPs. CS/CB may comprise data transmissions from different TPs in a cooperating set for different time resources, for instance subframes, using scheduling and beamforming techniques. The TPs may be chosen dynamically or semi-statically. CS/CB may comprise DPS and semi-static point selection (SSPS). DPS may comprise data transmission from one TP at a time. The TP may change from one subframe or resource block (RB) to another, but data is never simultaneously available from multiple TPs. SSPS may comprise data transmission from one TP at a time, but the TP may change in only a semi-static manner. While the known CoMP schemes may improve network performance, there is still room to further improve CoMP.

In 3GPP Technical Specification Group (TSG) Radio Access Network (RAN) #60 approved a study item to evaluate CoMP in networks with a non-ideal, but typical, backhaul. In particular, RAN #60 proposed evaluating coordinated scheduling and beamforming, including semi-static point selection/muting, as potential CoMP techniques. The evaluation would consider the level of backhaul delay achievable with a non-ideal backhaul and focus on CoMP among macro eNBs, among macro eNBs and small-cell eNBs, and among small-cell eNBs. The evaluation would consider prior small-cell enhancement Rel-11 work and study items. If any CoMP techniques proved beneficial, then those CoMP techniques would be recommended.

The benefit of CoMP in addressing a non-ideal backhaul may be enhanced by improving information pertinent to CoMP scheduling and ICI. Such information may include multi-point CSI, intermediate scheduling information, and ICI information imposed across various TPs in the cooperating set. Multi-point CSI feedback is standardized in Rel-11. Multi-point CSI feedback may be developed as an extension of single-cell feedback, where each CSI process may include a rank, a precoding matrix, and channel quality indicators (CQIs). Some forms of CSI (e.g., open loop CSI) may be less sensitive to temporal delays and may therefore be beneficial for non-ideal backhauls. Intermediate scheduling information and ICI information may be derived with multi-point CSIs and used to optimize the transmission of other TPs in the cooperating set. That information may reflect a statistical property of the ICI as opposed an instantaneous property of the ICI in order to address the backhaul delay.

Disclosed herein are embodiments for improving CoMP. The embodiments may provide for various parameters, or CSI, that TPs may share among each other. The TPs may share those parameters over the X2 interface using the X2 application protocol (X2AP). By sharing those parameters, the TPs may further optimize CoMP and thus further optimize network performance by, for instance, reducing or suppressing ICI. The parameter sharing may be referred to as inter-point signaling. A source TP, TP A, may signal one or a subset of parameters to one or more destination TPs in a cooperating set. The parameters may relate to transmission properties of TP A and may assist the other TPs with understanding ICI properties and effectively providing CoMP. In other words, the destination TPs may adjust their transmission properties based on the parameters they receive from the source TP. For instance, the destination TPs may adjust their transmission power, transmission direction, or transmission scheduling. The parameters may comprise a transmission rank, a beamforming matrix, a covariance matrix, a dominant eigenvector of the covariance matrix, a transmission power, a modulation scheme or code rate, an on/off status, a control region size, a multicast-broadcast single-frequency network (MBSFN) pattern, an almost-blank-subframe (ABS) pattern, a channel state information reference signal (CSI-RS) configuration, and a subframe allocation for transmission mode (TM) 9/10.

A transmission rank may indicate a number of spatial layers transmitted by the source TP, TP A, in other words how much data (e.g., how many packets or blocks) TP A may transmit to a UE at a time. By knowing the transmission rank of TP A, other TPs, which may be referred to as destination TPs, may be able to optimize their transmissions by optimizing their numbers of layers or beamforming directions. For instance, if TP A transmits at a high rank, then TP B, a destination TP, may choose to schedule a low-rank transmission as the spatial channel freedom achievable by an interference rejection combining (IRC) receiver of a user in cell B, which may be associated with TP B, may be limited. Alternatively, if TP A transmits at a low rank, then TP B may choose to a higher rank. In short, if multiple TPs use high transmission ranks, then there may be increased ICI; thus, staggering transmission ranks may reduce ICI.

A beamforming matrix may indicate a beamforming/precoding operation of TP A. The destination TPs may use the beamforming matrix to fine tune their beamforming vectors in order to avoid ICI. For instance, TP A may have a beamforming vector, $v_A$, that may indicate how TP A's energy is allocated to the different degrees of freedom in space, and TP B may have a beamforming vector, $v_B$, that may indicate how TP B's energy is allocated to the different degrees of freedom in space. If TP A indicates to TP B that TP A will use $v_A$, then TP B may choose $v_B$ so that $v_B$ is orthogonal to $v_A$ or as orthogonal to $v_A$ as possible. Alternatively, TP A may indicate $v_A$, which may be a beamforming matrix averaged, for instance, over a number of subframes and intended to reflect the temporal average property of beamforming operation at TP A. A UE located in cell B may choose its beamforming vector, $V_B$, as a conjugate transpose, which may be represented by w. As a result, r, the ICI received by the UE in cell B, may be eliminated as shown in the following equations:

$$r=w^H v_A s_A = v^H_B v_A s_A = 0, \quad (1)$$

where $w^H$ is the Hermitian operator of w, $s_A$ is the data vector transmitted in cell A, and $v^H_B$ is the Hermitian operator of $v_B$. Typically, the beamforming matrices of TP A may be the same rank as the indicated transmission rank of the same source TP. In other words, if the transmission rank is 1, then the beamforming matrix may have a rank of 1, thus indicating a beamforming vector. If, however, the transmission rank is 2, then the beamforming matrix may be a matrix of rank 2. The beamforming decisions may be changed every subframe. In short, if an eNB has multiple transmitting antennae, then the eNB may steer its transmission energy toward a single user instead of scattering its transmission energy, and the other eNB transmission antenna nearby may transmit energy in an orthogonal manner.

A covariance matrix of a signal transmitted at a source TP may indicate to destination TPs the spatial domain characteristics of ICI, which the destination TPs may use to optimize their beamforming strategies and user scheduling. The covariance matrix, $R_A$, may be calculated as follows:

$$R_A = v_A v^H_A, \quad (2)$$

where $v^H_A$ is the Hermitian operator of $v_A$.

A dominant eigenvector of $R_A$ may indicate the largest eigenvalue of the covariance matrix. TP A may compute $R_A$ based on long-term channel properties, which may allow for improved performance, for instance improved throughput, by taking channel state information into account, yet the information in $R_A$ could still be conveyed to neighboring TPs via a backhaul connection with non-ideal delays. Long-term channel properties may refer to, or be associated with, things like trees and houses that do not significantly change channel conditions over time. Ideally, TP A may provide $v_A$. If, however, that is too much to share, then TP A may provide $R_A$. If that is still too much to share, then TP A may provide the dominant eigenvector of $R_A$.

A transmission power may indicate a power of data transmission from TP A and thus indicate a level of interference with other TPs. Generally, a higher transmission power may cause more interference. The transmission power may be indicated as an absolute power, for instance decibel-milliwatts (dBm), or as a relative power ratio with respect to a reference power. For instance, the reference power may be a cell-specific reference signal (CRS) power associated with TP A or a CRS power associated with a destination TP, for instance TP B.

A modulation scheme may indicate whether TP A is using, for instance, quadrature phase-shift keying (QPSK), 16-quadrature amplitude modulation (QAM), or 64-QAM. A code rate may indicate how many bits TP A sends per symbol and may change in each subframe. If TP A has a good channel, then it may send more bits per symbol. Conversely, if TP A has a poor channel, then it may send less bits per symbol. Sharing this information may allow destination TPs to choose appropriate modulation schemes or coding rates that match the UE that the TPs are transmitting to. When a UE and a TP employ the same modulation scheme or code rate, they may experience higher throughput and a reduced SNR.

An on/off status may indicate whether or not TP A is actively transmitting. An on status may indicate that TP A is actively transmitting on, and thus occupying, a corresponding frequency resource. An off status may indicate that TP A is not actively transmitting on, and thus not occupying, the corresponding frequency resource. In this manner, the exchanged on/off status may be used to perform dynamic point blanking (DPB), where a TP is dynamically turned on or off to control its ICI with other TPs. One bit may be used to signal TP A's on/off status. The on/off status may also be signaled for different types of signals, for instance a CRS, a physical downlink shared channel (PDSCH), and a physical downlink control channel (PDCCH). Alternatively, a bitmap of size $N_{PRB}$ could indicate, for each physical resource block (PRB), whether or not TP A intends to blank specific frequency resources in subframes. A PRB may comprise 168 resource elements (REs).

A control region size may indicate a control region size of TP A so that the destination TPs may adjust their control region sizes to match TP A's control region size. An LTE subframe may comprise N orthogonal frequency-division multiplexing (OFDM) symbols. N may be 14 for a normal cyclic prefix, and N may be 12 for an extended cyclic prefix. The first L symbols may be used to carry downlink signals associated with the PDCCH, and the remaining N-L symbols may be used to carry downlink signals associated with the PDSCH. L may typically be 1-3 and may change in each subframe. As a result, TP A may indicate its control region size to be L, and the destination TPs may adjust their control region sizes to also be L. By matching their control region sizes, the TPs may better align their ICI. For an enhanced PDCCH (EPDCCH), the TPs may coordinate their resources in a similar manner; however, instead of coordinating L, which may represent a time resource, the TPs may coordinate their frequency resources so that they transmit downlink signals associated with the EPDCCH at the same frequencies.

An MBSFN pattern may indicate which subframes in a frame are MBSFN subframes. LTE may allow for two types of subframes, a unicast subframe and an MBSFN subframe. An LTE frame may comprise 10 subframes, and each subframe may have a 1 millisecond (ms) duration. Up to 6 subframes in a frame may be MBSFN subframes, while the remaining subframes may be unicast subframes. The unicast and MBSFN subframes may be in any pattern within the frame. If the TPs use the same MBSFN pattern, then ICI may be further reduced.

An ABS pattern may indicate which subframes in a frame have no or little transmission power associated with them. In that respect, an ABS pattern may be similar to DPB described above. If the TPs use the same ABS pattern, then ICI may be further reduced.

A CSI-RS configuration may indicate powers of TP A's CSI-RSs. A UE may use CSI-RSs to measure the downlink channel as described in U.S. patent application Ser. No. 13/851,949 filed Mar. 27, 2013 by Runhua Chen, et al., and titled "Method and Apparatus for Channel State Information Feedback in a Coordinated Multi-Point Communication System," which is incorporated by reference. Some REs may comprise CSI-RSs, and some REs may be left blank. If TP A indicates which CSI-RSs are present and which are blank, then the destination TPs may make detailed measurements and thus configure channel and interference measurement resources in their cells for accurate CSI reporting by their respective UEs.

A subframe allocation for TM 9/10 may indicate which subframes in a frame are MBSFN subframes, as well as which subframes in the frame are used for TM 9 or 10. In Rel-8 and 3GPP LTE Release 9 (Rel-9), specific subframes are always allocated for MBSFN while the remaining subframes are used for unicast. In 3GPP LTE Release 10 (Rel-10), however, if there are no MBSFN services being used, then the subframes designated for MBSFN may be used for unicast if the TM is 9 or 10. Rel-9 and Rel-10 are incorporated by reference. If TPs in a cooperating set are part of the same MBSFN area, a common subset of the MBSFN subframe allocation may be used for a physical multicast channel (PMCH). On the other hand, if TPs in a cooperating set are not part of the same MBSFN area, then it may be desirable to indicate which MBSFN subframes may be used for demodulation reference signal (DMRS)-based transmission to UEs configured in TM 9 or 10. TP A may therefore indicate a subset of the MBSFN pattern on which the destination TPs can reliably configure their UEs to make channel and interference measurements.

The parameters may be transmitted using an existing X2 framework. This may reduce complexity in 3GPP LTE Release 12 (Rel-12) and beyond. Suitable signals for inter-point parameter signaling include CSI reports (e.g., rank indicator (RI), precoding matrix indicator (PMI), and CQI) for individual UEs, measurement reports (e.g., reference signal received power (RSRP)) of individual UEs, spatial/frequency/time transmission properties (e.g., RI and PMI) of eNBs, enhanced RNTP-type information in the frequency/time/power/spatial domain, and enhanced ABS information in the power/spatial domain. The CSI reports may be configuration of such CSI reports or associations with CSI-RS resources.

The destination TPs may use those parameters to optimize their transmission and reception strategies in order to reduce ICI and improve CoMP scheduling despite network imperfections such as backhaul capacity limitation, backhaul delays, UE feedback delay, channel variations between the time instance of UE feedback, time instance of CoMP scheduling, and time instance of actual data transmission. While the parameters are described as being transmitted among TPs, it is important to note that TPs may belong to the same eNB or different eNBs and TPs may be configured as a single logical cell or different logical cells. As a result, the parameters may transmitted over the X2 interface for inter-eNB CoMP, over a front-haul common public radio interface (CPRI) if all TPs belong to the same eNB, or over another suitable interface, for instance to support CoMP or dual connectivity of a UE with a C-plane split.

The parameters may be transmitted among TPs on a wideband basis where a parameter applies to the entire network bandwidth. For instance, if a UE reports a wideband CQI/PMI, then one wideband CQI/PMI may be exchanged over the backhaul for the entire network bandwidth instead of multiple CQI/PMIs over the backhaul for each subband because the latter may incur substantial overhead. Alternatively, the parameters may be transmitted on a narrow-band basis, for instance for each PRB or each precoding resource block group (PRG) in the network bandwidth. Some parameters (e.g., transmission rank, control region size, MBSFN pattern) may be transmitted on a wideband basis while other parameters (e.g., beamforming matrix, transmission power) may be transmitted on a narrow-band basis.

The association between a CSI-RS resource and a CoMP TP may be a network configuration issue and transparent to the UE in Rel-11. Such a principle may be preserved in Rel-12 and beyond. If an association between a CSI-RS resource and a CoMP TP is needed for CoMP, however, then the association may be signaled over the backhaul. Alternatively, an association between a CSI report and a CoMP TP may be signaled over the backhaul.

The parameters may be transmitted among TPs in a centralized or distributed scheduling manner. Some parameters may be more suitable for centralized scheduling. Similarly, other parameters may be more suitable for distributed scheduling.

The transmission capacity and delays over the backhaul links may be highly dependent on the type of backhaul. To cope with the backhaul limitation, the parameters may be transmitted at different temporal frequencies. Some parameters may reflect short-term ICI properties and should therefore be transmitted more frequently. Other parameters may reflect long-term ICI properties and should therefore be transmitted less frequently because they may vary slowly in the time domain. Transmission rank and transmission power may be two of the parameters that reflect long-term ICI properties. There may be modification periods so that destination TPs may apply the parameters at the same time. The application may occur at a frame boundary depending on the system frame number, which may be aligned among all destination TPs.

In LTE, the minimum scheduling unit may be a subframe of 1 ms duration, so ICI may change every subframe. Ideally, the parameters should be transmitted every subframe, but that may not be feasible considering backhaul capacity and delay constraints. In addition, due to backhaul propagation delay, the parameters may be outdated and less accurate when used for actual CoMP scheduling. This may be referred to as the flashlight effect, which may be well known in single multiple-input and multiple-output (MIMO). The delay may be proportional to the number of TPs in the cooperating set and the number of iterations if distributed scheduling is used. To mitigate the flashlight effect, the parameters may comprise information averaged over time. The matrix W may be used as an example. In a first embodiment, W may be the average W used by TP A over K subframes prior to transmitting W to the destination TPs. K may be any positive integer. In a second embodiment, W may be the average W TP A expects to use over the K subframes subsequent to transmitting W to the destination TPs. Once again, K may be any positive integer. In a third embodiment, W may be the average W used by TP A over $K_1$ subframes prior to a subframe S and over $K_2$ subframes subsequent to subframe S. Both $K_1$, $K_2$, and S may be any positive integers.

Relative narrow-band transmit power (RNTP) signaling may be included for each used DMRS antenna port, as well as the number of DMRS antenna ports used for PDSCH. For instance, a TP transmitting four-layer PDSCH in the downlink (e.g., ports 7-10) can send over the backhaul four RNTP values, one for each antenna port. Alternatively, there may be a fixed number of RNTPs exchanged between TPs corresponding to the available DMRS antenna ports (e.g., ports 7-15). For DMRS antenna ports not actually used for PDSCH transmission, the RNTP threshold may be set to a default value (e.g., $-\infty$) and a default RNTP value (e.g., 0) can be signaled. For instance, if the RNTP threshold is set to $-\infty$, then the default RNTP value for any unused DMRS antenna port may be 0, indicating that no interference is expected on that antenna port.

The existing ABS mechanism may be extended to include spatial domain information. For instance, the ABS pattern may be signaled for each DMRS antenna port. Likewise, the number of DMRS antenna ports for which an ABS pattern is signaled can be explicitly signaled over the backhaul. Alternatively, the number of signaled ABS patterns may be fixed (e.g., 8 for antenna ports 7-15), where a default ABS pattern may be configured for all DMRS antenna ports not expected to be used for CoMP transmission. For instance, a possible default ABS pattern may signify that all subframes are blank subframes as no interference is transmitted on the associated DMRS antenna ports.

Furthermore, a TP may transmit to a first set of TPs parameters that the TP desires from the first set of TPs. For instance, TP B may transmit to TP A parameters that TP B desires from TP A. Alternatively, the TP may transmit to a first set of TPs parameters that the TP received from a second set of TPs. For instance, TP B may transmit to TP A parameters that TP B received from TP C. TP B may transmit all or a subset of the parameters described above. TP B may transmit those parameters on a wideband basis, a narrowband basis, or with different temporal frequencies.

Each TP may remain independent. As a result, when a destination TP receives a parameter from a source TP, the destination TP may or may not account for the parameter. In that sense, the parameters may be informational parameters and may not specify destination TP behavior.

Figure 3:
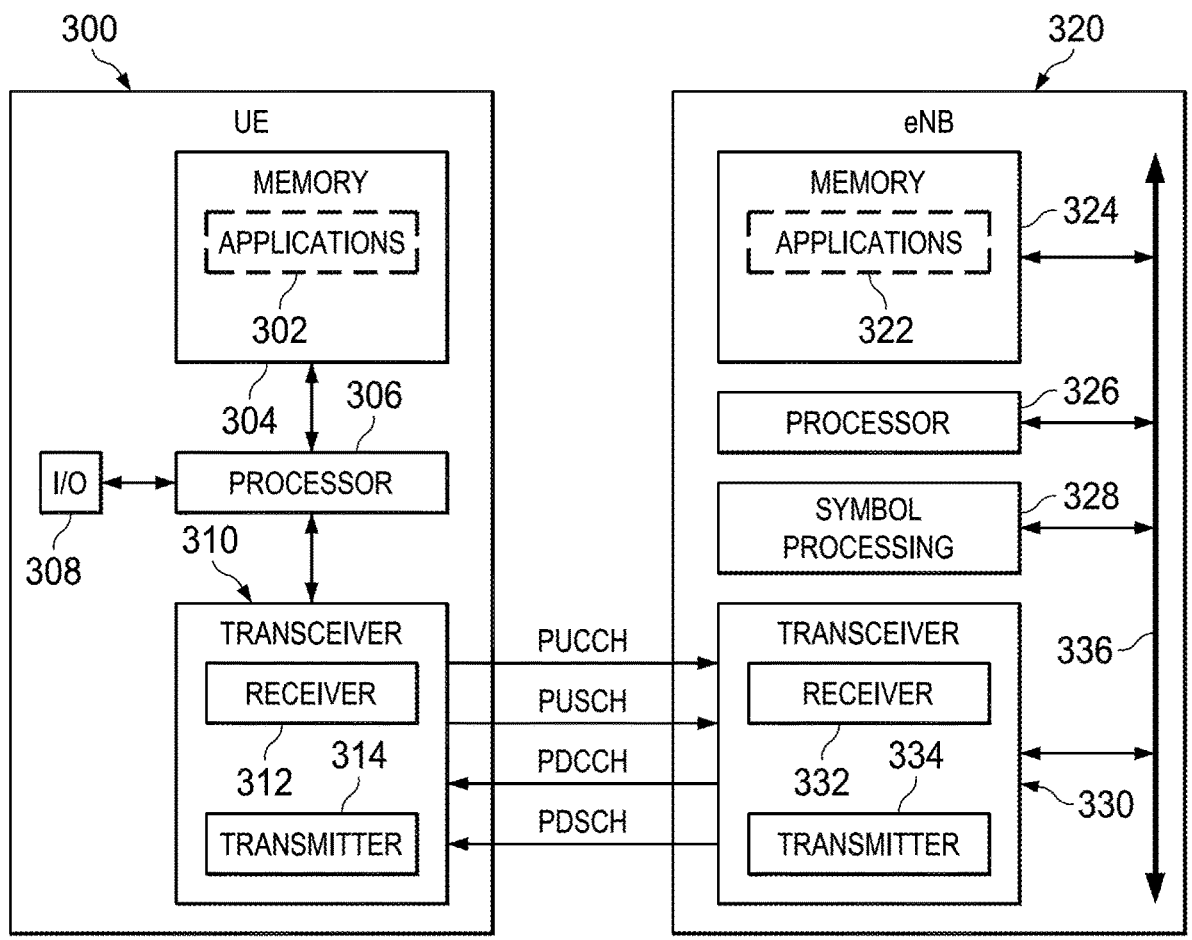
FIG. 3 is a schematic diagram of a UE and an eNB in communication with each other.

FIG. 3 is a schematic diagram of a UE 300 and an eNB 320 in communication with each other. The UE 300 may be a cell phone, computer, or other wireless network device. The eNB 320 may be any fixed hardware or mobile hardware suitable for providing services between the UE 300 and a wider network. The UE 300 and the eNB 320 may be suitable for implementing the disclosed embodiments.

The UE 300 may comprise a processor 306 coupled to a memory 304, input/output (I/O) circuitry, and a transceiver 310. The processor 306 may comprise several processors adapted to various operational tasks of the UE, including signal processing and channel measurement and computation. The memory 304 may store applications 302 that the processor 306 may execute as directed by the user and may store operating instructions for the UE 300. The I/O circuitry 308 may comprise a microphone, speaker, display, and related software. The transceiver 310 may comprise a receiver 312 and a transmitter 314 suitable for wireless communication with the eNB 320. The transceiver 310 may typically communicate with the eNB 320 over various communication channels. For instance, the transceiver 310 may send uplink information to the eNB 320 over the physical uplink control channel (PUCCH) and the physical uplink shared channel (PUSCH). Similarly, the transceiver 310 may receive downlink information from the eNB 320 over the PDCCH and the PDSCH.

The eNB 320 may comprise a processor 326 coupled to a memory 324, a symbol processing circuit 328, and a transceiver 330 via a bus 336. The processor 326 and the symbol processing circuit 328 may comprise several processors adapted to various operational tasks, including signal processing and channel measurement and computation. The memory 324 may store applications 322 that the processor 326 may execute for specific users and may store operating instructions for the eNB 320. The transceiver 330 may comprise a receiver 332 and a transmitter 334 suitable for wireless communication with the UE 300. The transceiver 330 may typically communicate with the UE 300 over various communication channels. For instance, the transceiver 330 may send downlink information to the UE 300 over the PDCCH and the PDSCH. Similarly, the transceiver 330 may receive uplink information from the UE 300 over the PUCCH and the PUSCH.

Figure 4:
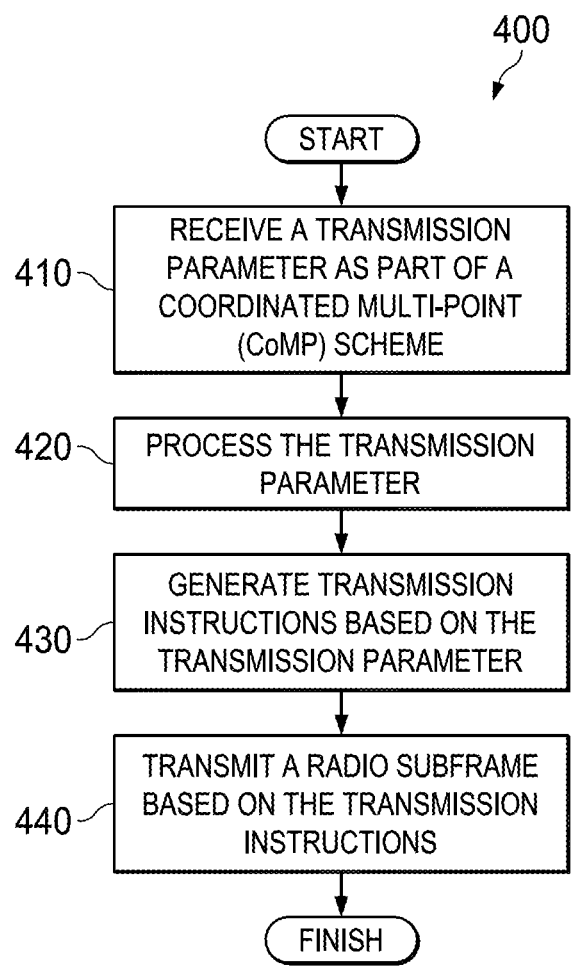
FIG. 4 is a flowchart illustrating a method of inter-point parameter signaling according to an embodiment of the disclosure.

FIG. 4 is a flowchart illustrating a method 400 of interpoint parameter signaling according to an embodiment of the disclosure. The method 400 may be implemented in any suitable TP. At step 410, a transmission parameter may be received as part of a CoMP scheme. For instance, the transmission parameter may be one of the parameters described above. At step 420, the transmission parameter may be processed. At step 430, transmission instructions may be generated based on the transmission parameter. For instance, the transmission instructions may determine a way to transmit data in a way that provides for reduced ICI in light of the transmission parameter. At step 440, a radio subframe may be transmitted based on the transmission instructions. Additional subframes may similarly be transmitted.

Certain features that are described in the context of separate embodiments can also be combined and implemented as a single embodiment. Conversely, various features that are described in the context of a single embodiment can also be implemented in multiple embodiments separately or in any suitable sub-combinations. Moreover, although features may be described as acting in certain combinations and even initially claimed as such, one or more features from a combination as described or a claimed combination can in certain cases be excluded from the combination, and the claimed combination may be directed to a sub-combination or variation of a sub-combination. Although various aspects of the invention are set out in the independent claims, other aspects of the invention comprise other combinations of features from the embodiments and/or from the dependent claims with the features of the independent claims, and not solely the combinations explicitly set out in the claims. Certain functions that are described in this specification may be performed in a different order and/or concurrently with each other. Furthermore, if desired, one or more of the above-described functions may be optional or may be combined.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A transmission point (TP) comprising:
   a processor configured to generate transmission parameters indicative of transmission properties used by the TP, wherein the transmission parameters comprise a control region size used by the TP, a multicast-broadcast single-frequency network (MBSFN) pattern, a parameter indicative of an eigenvector, and at least one of a transmission power used by the TP and an on/off status; and
   a transmitter coupled to the processor and configured to transmit the transmission parameters as part of a coordinated multi-point (COMP) scheme.

2. The TP of claim 1, wherein the transmission parameters further comprise a transmission rank, and wherein the transmission rank indicates a number of spatial layers transmitted by the TP.

3. The TP of claim 1, wherein the transmission parameters further comprise a beamforming matrix, and wherein the beamforming matrix indicates a beamforming/precoding operation of the TP.

4. The TP of claim 1, wherein the transmission power indicates a power of the transmitter when transmitting data.

5. The TP of claim 4, wherein the transmission power is indicated as an absolute power.

6. The TP of claim 4, wherein the transmission power is indicated as a power relative to a reference power.

7. The TP of claim 1, wherein the transmission parameters further comprise the on/off status, and wherein the on/off status indicates whether or not the TP is actively transmitting.

8. The TP of claim 7, wherein the on/off status comprises on/off data for each frequency resource in a subframe.

9. A transmission point (TP) comprising:
   a processor configured to generate transmission parameters indicative of transmission properties used by the TP, wherein the transmission parameters comprise a control region size used by the TP, a multicast-broadcast single-frequency network (MBSFN) pattern, a parameter indicative of an eigenvector, and at least one of a transmission power used by the TP and an on/off status; and
   a transmitter coupled to the processor and configured to transmit the transmission parameters as part of a coordinated multi-point (COMP) scheme.

10. The TP of claim 9, wherein the transmitter is further configured to transmit the transmission parameters for all frequency resources in a subframe.

11. The TP of claim 9, wherein the transmitter is further configured to transmit the transmission parameters for less than all frequency resources in a subframe.

12. An apparatus comprising:
    a receiver configured to receive transmission parameters as part of a coordinated multi-point (CoMP) scheme;
    a processor coupled to the receiver and configured to:
      process the transmission parameters, and
      generate transmission instructions based on one or more of the transmission parameters; and
    a transmitter coupled to the processor and configured to transmit a radio subframe based on the transmission instructions, wherein one or more of the transmission parameters is indicative of a transmission property of the TP, and wherein the transmission parameters include a control region size used by the TP, a multicast-broadcast single-frequency network (MBSFN) pattern, a parameter indicative of an eigenvector, and at least one of a transmission power used by the TP and an on/off status.

13. The apparatus of claim 12, wherein the processor is configured to generate the transmission instructions to reduce inter-cell interference (ICI).

14. The apparatus of claim 13, wherein the processor is configured to generate the transmission instructions to comprise instructions to transmit with a first beamforming matrix that is substantially orthogonal to a second beamforming matrix associated with at least one of the transmission parameters.

15. The apparatus of claim 12, wherein the transmission parameters further include a transmission rank.

16. The apparatus of claim 12, wherein the transmission parameters further include a beamforming matrix.

17. The apparatus of claim 12, wherein the transmission parameters include the on/off status.

* * * * *